United States Patent
Laviola

(10) Patent No.: US 10,883,404 B2
(45) Date of Patent: Jan. 5, 2021

(54) METHOD AND APPARATUS FOR CONTROLLING REDUCTANT INJECTION INTO AN EXHAUST GAS FEEDSTREAM OF AN INTERNAL COMBUSTION ENGINE

(71) Applicant: GM Global Technology Operations LLC, Detroit, MI (US)

(72) Inventor: Francesco Laviola, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 16/274,591

(22) Filed: Feb. 13, 2019

(65) Prior Publication Data

US 2020/0256231 A1    Aug. 13, 2020

(51) Int. Cl.
*F01N 3/20*    (2006.01)

(52) U.S. Cl.
CPC .......... *F01N 3/208* (2013.01); *F01N 2610/02* (2013.01); *F01N 2900/0408* (2013.01); *F01N 2900/0412* (2013.01); *F01N 2900/1404* (2013.01); *F01N 2900/1808* (2013.01)

(58) Field of Classification Search
CPC ............... F01N 3/208; F01N 2610/02; F01N 2900/1808; F01N 2900/1821; F01N 2900/1822
See application file for complete search history.

(56) References Cited

U.S. PATENT DOCUMENTS

| | | | |
|---|---|---|---|
| 2010/0205937 A1* | 8/2010 | Duret | F01N 3/208 60/274 |
| 2010/0212417 A1* | 8/2010 | Crawford | F01N 3/208 73/114.76 |
| 2018/0223713 A1* | 8/2018 | Andreis | F01N 13/009 |
| 2019/0226375 A1* | 7/2019 | Paielli | F01N 3/208 |

* cited by examiner

*Primary Examiner* — Jonathan R Matthias
(74) *Attorney, Agent, or Firm* — Quinn IP Law

(57) ABSTRACT

A reductant delivery system for an internal combustion engine is arranged to inject a reductant into the exhaust aftertreatment system upstream of a catalytic device. A method for controlling the reductant delivery system includes operating the fluidic pump at a preset state, operating the injector at a zero-flow state, and monitoring, via a pressure sensor, a pressure in the reductant delivery system upstream of the injector to determine a zero-flow pressure. The injector is activated under a preset condition and an actual pressure drop upstream of the injector is monitored. A pressure drop deviation is determined based upon the actual pressure drop upstream of the injector and an expected pressure drop upstream of the injector. An adjustment to the activation of the injector is determined based upon the pressure drop deviation, and the injector is controlled based upon the adjustment.

20 Claims, 3 Drawing Sheets

METHOD AND APPARATUS FOR CONTROLLING REDUCTANT INJECTION INTO AN EXHAUST GAS FEEDSTREAM OF AN INTERNAL COMBUSTION ENGINE

BACKGROUND

Internal combustion engines fluidly couple to exhaust aftertreatment systems that purify exhaust gases generated as byproducts of combustion. Exhaust aftertreatment systems may include oxidation catalysts, reduction catalysts, selective catalytic reduction catalysts and particulate filters. Byproducts of combustion may include unburned hydrocarbons, carbon monoxide, nitrides of oxide, which may be referred to as NOx molecules, and particulate matter. Operation may be monitored by one or more sensing devices that are disposed in the exhaust gas feedstream, including, e.g., a NOx sensor. Operation may also be determined employing simulation models that dynamically execute during operation.

Selective catalytic reduction catalysts (SCRs) may employ reductants for reducing NOx molecules to elemental nitrogen. One known reductant is urea, which may be transformed into ammonia (NH3) in an exhaust system. The reductant may be injected into the exhaust gas feedstream upstream of one or multiple SCRs, and may be stored on a surface or otherwise captured for use in reducing NOx molecules to elemental nitrogen and water.

Reductant delivery systems may include a control routine that operates to control reductant injection employing feedback that is based upon monitoring the exhaust gas feedstream downstream of an SCR. Monitoring the exhaust gas feedstream downstream of an SCR to control a reductant delivery system may introduce latencies that affect responsiveness, and thus may reduce dynamic responsiveness and associated emission control during engine operation.

SUMMARY

An internal combustion engine fluidly coupled to an exhaust aftertreatment system is described, wherein the exhaust aftertreatment system includes a catalytic device, e.g., a selective catalytic reduction device (SCR). A reductant delivery system is arranged to inject a reductant into the exhaust aftertreatment system upstream of the catalytic device. The reductant delivery system includes a fluidic pump fluidly connected to an injector that is disposed in the exhaust aftertreatment system upstream relative to the catalytic device. A method for controlling the reductant delivery system includes operating the fluidic pump at a preset state, operating the injector at a zero-flow state, and monitoring, via a pressure sensor, a pressure in the reductant delivery system upstream of the injector to determine a zero-flow pressure. The injector is activated under a preset condition and an actual pressure drop upstream of the injector is monitored. A pressure drop deviation is determined based upon the actual pressure drop upstream of the injector and an expected pressure drop upstream of the injector. An adjustment to the activation of the injector is determined based upon the pressure drop deviation, and the injector is controlled based upon the adjustment.

An aspect of the disclosure includes determining the adjustment factor based upon the difference between the expected pressure drop and the actual pressure drop in the reductant delivery system by initially operating the fluidic pump at a preset state, operating the injector at a zero-flow state, and monitoring, via a pressure sensor, pressure upstream of the injector to determine a zero-flow pressure, activating the injector under a preset condition and monitoring the actual pressure drop upstream of the injector, and determining the adjustment factor based upon a difference between an expected pressure drop for the preset condition and the actual pressure drop in the reductant delivery system for the preset condition.

Another aspect of the disclosure includes determining the adjustment factor based upon the difference between the expected pressure drop for the preset condition and the actual pressure drop in the reductant delivery system for the preset condition by executing the following relationship:

$$ADJ = 1 + Kp^* e(t) + Ki^* \int e(t)$$

rein ADJ represents the adjustment factor, $e(t)$ represents the difference between the expected pressure drop for the preset condition and the actual pressure drop for the preset condition, Kp represents a proportional gain scalar factor, and Ki represents an integral gain scalar factor.

Another aspect of the disclosure includes the proportional gain scalar factor Kp and the integral gain scalar factor Ki being selected to achieve a desired operating characteristic.

Another aspect of the disclosure includes the desired operating characteristic being one of an underdamped operation, an overdamped operation, or a critically-damped operation.

Another aspect of the disclosure includes controlling the reductant injector based upon the adjustment factor and the initial injector command, including determining an initial injector pulsewidth command based upon operating conditions, and adjusting the initial injector pulsewidth command based upon the difference between the expected pressure drop and the actual pressure drop.

Another aspect of the disclosure includes adjusting the initial injector pulsewidth command based upon the difference between the expected pressure drop and the actual pressure drop by decreasing the injector pulsewidth command when the difference between the expected pressure drop and the actual pressure drop is less than an expected pressure drop deviation.

Another aspect of the disclosure includes adjusting the initial injector pulsewidth command based upon the difference between the expected pressure drop and the actual pressure drop by increasing the injector pulsewidth command when the difference between the expected pressure drop and the actual pressure drop is greater than an expected pressure drop deviation.

Another aspect of the disclosure includes controlling the reductant injector based upon the adjustment factor and the initial injector command, including determining an initial injection frequency command based upon operating conditions; and adjusting the initial injection frequency command based upon the difference between the expected pressure drop and the actual pressure drop.

Another aspect of the disclosure includes adjusting the initial injection frequency command based upon the difference between the expected pressure drop and the actual pressure drop by decreasing the initial injection frequency command when the difference between the expected pressure drop and the actual pressure drop is less than an expected pressure drop deviation.

Another aspect of the disclosure includes adjusting the initial injection frequency command based upon the difference between the expected pressure drop and the actual pressure drop by increasing the initial injection frequency command when the difference between the expected pressure drop and the actual pressure drop is greater than an expected pressure drop deviation.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
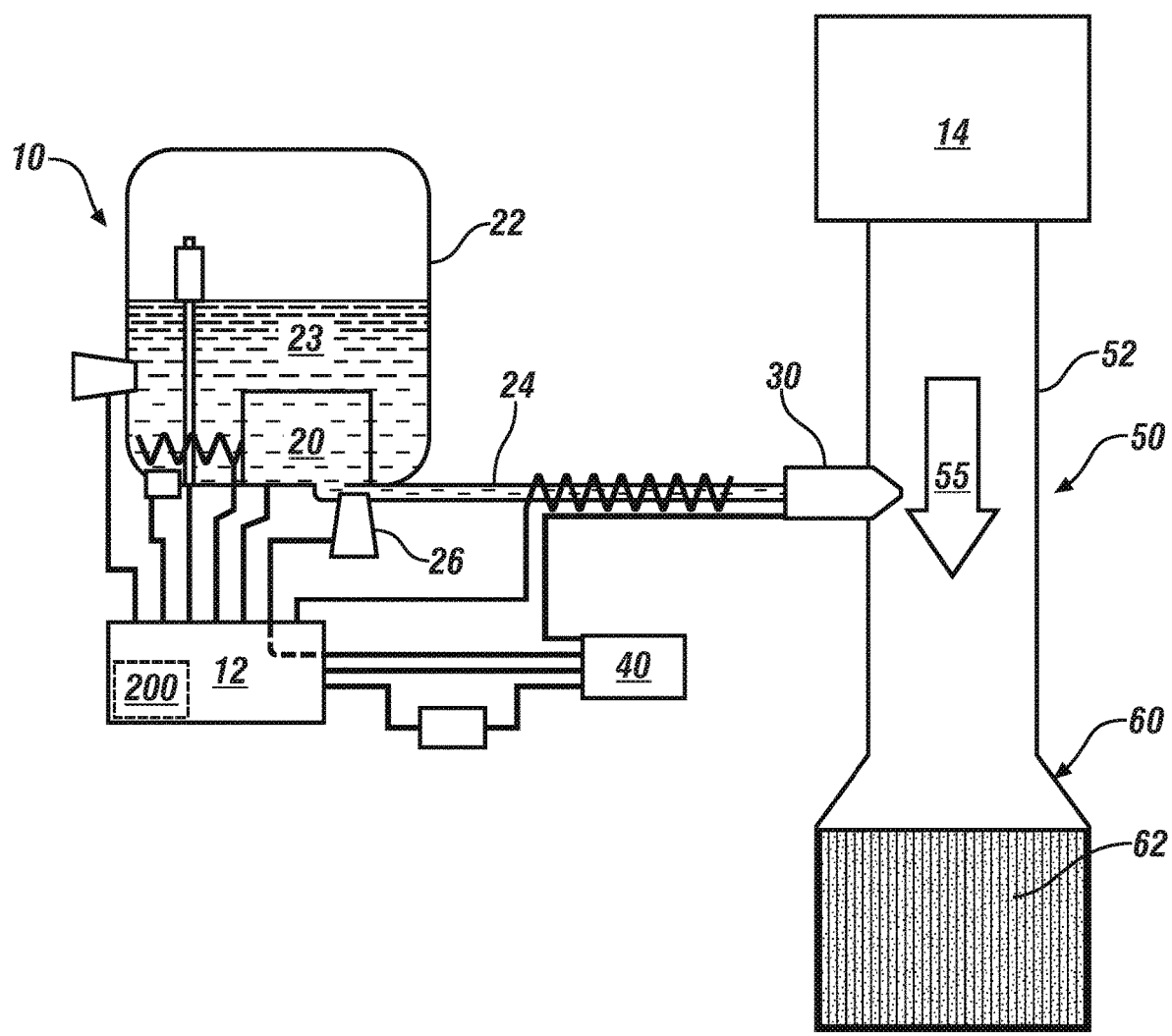
FIG. 1 schematically illustrates a reductant delivery system that is arranged to inject a reductant into an exhaust gas feedstream for an internal combustion engine upstream of a catalytic device, in accordance with the disclosure.

Referring now to the drawings, wherein the depictions are for the purpose of illustrating certain exemplary embodiments only and not for the purpose of limiting the same, FIG. 1 schematically illustrates a reductant delivery system (RDS) 10 that is arranged to inject a reductant into an exhaust gas feedstream 55 upstream of a catalytic device 62, which may be one element of an exhaust aftertreatment system 60. The exhaust gas feedstream 55 is generated by an internal combustion engine (engine) 14, and is entrained in an exhaust system 50 that includes the exhaust aftertreatment system 60.

The engine 14 may be a multi-cylinder internal combustion engine that combusts a mixture of directly-injected fuel, intake air and recirculated exhaust gas to generate mechanical power. The engine 14 may be configured as a compression-ignition engine, although the concepts described herein may be employed on other engine configurations that employ embodiments of the exhaust aftertreatment system 60 described herein. The engine 14 may be employed on a ground vehicle, e.g., a passenger car, truck, agricultural vehicle or a construction vehicle, on a marine vehicle, or in a stationary setting, e.g., coupled to an electric power generator. As employed herein, the term "upstream" and related terms refer to elements that are towards an origination of a flow stream relative to an indicated location, and the term "downstream" and related terms refer to elements that are away from an origination of a flow stream relative to an indicated location.

The reductant delivery system 10 includes a fluidic pump 20 that is fluidly connected via a conduit 24 to a reductant injector 30, with operation being controlled by a RDS controller 12. The fluidic pump 20 may be a centrifugal pump, a rotary vane pump, a gerotor pump, or another configuration, and may be driven by a single-phase or multi-phase electric motor. The fluidic pump 20 is fluidly coupled to a refillable sump 22 that is configured to store reductant 23. The reductant injector 30 includes an injection nozzle that is advantageously positioned to feed into the exhaust system 50 upstream relative to the catalytic device 62 to controllably supply reductant into the exhaust gas feedstream 55 to facilitate NOx reduction, in one embodiment. A pressure sensor 26 is arranged to monitor fluidic pressure in the conduit 24 between the fluidic pump 20 and the reductant injector 30. Other elements of the reductant delivery system 10 may include a reductant temperature sensor, a reductant quality sensor, a fluidic level sensor, and/or a sump or conduit heating device, all of which may in communication with and/or controlled by the RDS controller 12. The RDS controller 12 includes a reductant injection control routine 200, which is described with reference to FIG. 2, et seq.

The exhaust aftertreatment system 60 includes one or a plurality of fluidly connected exhaust purifying devices for purifying engine exhaust gas prior to expulsion to ambient air, including the catalytic device 62. An exhaust purifying device may be any device that is configured to oxidize, reduce, filter, and/or otherwise treat constituents of the exhaust gas feedstream 55, including but not limited to hydrocarbons, carbon monoxide, nitrides of oxygen (NOx), and particulate matter. The catalytic device 62 may be closely coupled to an exhaust manifold of the engine 14, i.e., located within an engine compartment. Alternatively, the catalytic device 62 may be distally located, such as in an underfloor location when employed on a ground vehicle.

In one embodiment, the catalytic device 62 may be a selective catalyst reduction (SCR) catalyst. In one embodiment, the catalytic device 62 may include an SCR catalyst and a particulate filter for filtering particulate matter from the exhaust gas feedstream. When the catalytic device 62 is an SCR device, it may be a urea-based device, and the reductant injected by the reductant delivery system 10 may be urea. As appreciated by those skilled in the art, urea may convert to ammonia (NH3), which may be stored on the substrate of the catalytic device 62, and may react with and reduce NOx molecules to form elemental nitrogen (N2) and other inert gases. The catalytic device 62 includes, in one embodiment, a ceramic or metallic substrate having flow channels that have been coated with suitable materials including, by way of non-limiting examples: platinum-group metals such as platinum, palladium and/or rhodium; other metals, such as copper; cerium; and other materials. The coated materials effect chemical reactions to oxidize, reduce, filter or otherwise treat constituents of the exhaust gas feedstream under certain conditions related to temperature, flowrate, air/fuel ratio and others. The embodiment shown includes a portion of elements of the exhaust aftertreatment system 60 in one arrangement. Other arrangements of the elements of the exhaust aftertreatment system 60 may be employed within the scope of this disclosure, with such arrangements including other exhaust purifying devices and/ or exhaust gas flow management devices and/or noise abatement devices, depending upon requirements of the specific application.

An engine controller 40 may be arranged to monitor various sensing devices and execute control routines to command various actuators to control operation of the engine 14 in response to operator commands. Engine control includes controlling various engine operating parameters, including controlling preferred engine control states to minimize various exhaust gas constituents through chemical reaction processes that include, by way of non-limiting examples, oxidation, reduction, filtering, and selective reduction. Other engine control states include controlling operating parameters to warm-up the engine 14 and transfer heat or otherwise warm up the elements of the exhaust aftertreatment system 60 so as to effect efficacious operation thereof. The engine controller 40 is arranged to communicate with the RDS controller 12, either directly and/or via a communication bus.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. As used herein, the terms 'dynamic' and 'dynamically' describe steps or processes that are executed in real-time and that may include monitoring or otherwise determining states of parameters and updating the states of the parameters during execution of a routine or between iterations of execution of the routine.

Figure 2:
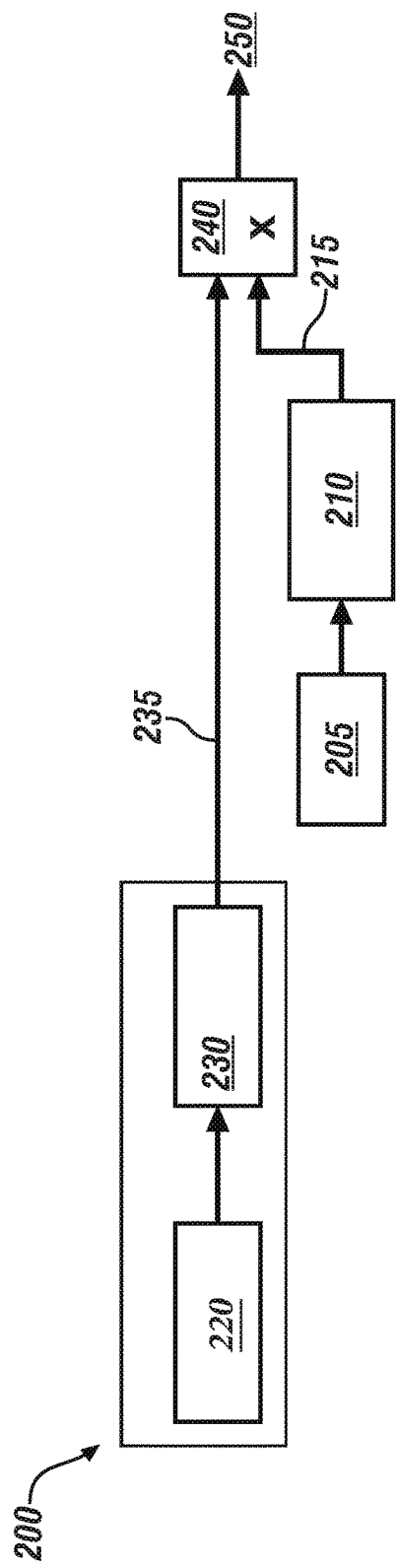
FIG. 2 schematically illustrates a reductant injection control routine that may be employed to control reductant injection upstream of a catalytic device that is an element of an exhaust aftertreatment system described with reference to FIG. 1 for purifying exhaust gases produced as a byproduct of combustion in an internal combustion engine, in accordance with the disclosure.

FIG. 2 schematically shows details related to the reductant injection control routine 200, which may be reduced to algorithmic code and executed by the RDS controller 12 to control the reductant injector 30 to inject reductant into the exhaust gas feedstream 55 upstream of the catalytic device 62. The reductant injection control routine 200 includes an algorithm that quickly compensates for drift in output of the reductant injector 30 by adjusting its command based on an evaluation of pressure drop that is caused by its injection operation. Overall, the reductant injection control routine 200 requests pump control to provide a constant reductant fluid flow rate to the reductant injector 30, and determines a deviation of measured pressure drop while injecting with regard to pressure drop by comparing with expected operation of an ideal reductant injector. The operation calculates and applies an adjustment factor.

In operation, the reductant injection control routine 200 includes determining an initial reductant dosing rate (205), and determining an initial injector command 215 for controlling the reductant injector based upon the desired reductant dosing rate (210).

An adjustment factor 235 is determined based upon a difference between an actual pressure drop in the reductant delivery system and an expected pressure drop in the reductant delivery system under similar operating conditions (220, 230). The initial injector command 215 is combined with the adjustment factor 235 (240) to determine a final injector command 250, and operation of the reductant injector 30 is controlled based upon the final injector command 250.

The adjustment factor 235 can be determined based upon a difference between an expected pressure drop and an actual pressure drop in the reductant delivery system under preset, controlled conditions (220, 230). This includes activating the fluidic pump 20 to have a constant fluidic flowrate under a condition when the reductant injector 30 is not operating, i.e., under a state when there is no reductant dosing being commanded, and monitoring and capturing a zero-flow pressure in the reductant delivery system 10 via the pressure sensor 26.

Upon commanding dosing operation of the reductant delivery system 10 with the initial injector command 215 for controlling the reductant injector 30 based upon the desired reductant dosing rate (210), fluidic pressure is measured by the pressure sensor 26 to determine an actual pressure drop (delta Pa). An expected pressure drop (delta Pe) is also determined, and is a calibrated pressure drop value that may be predetermined based upon the configuration of the reductant delivery system 10 that is determined in relation to commanded operating states for the reductant injector 30.

The adjustment factor 235 may be dynamically determined based upon a difference between the expected pressure drop for the preset condition and the actual pressure drop in the reductant delivery system 10. Determining the adjustment factor 235 to the activation of the reductant injector 30 based upon the difference between the expected pressure drop for the preset condition and the actual pressure drop in the reductant delivery system includes, in one embodiment, executing the following proportional-integral (PI) control relationship:

$$ADJ=1+Kp*e(t)+Kif*fe(t) \quad [1]$$

wherein:
ADJ represents the adjustment factor 235,
e(t) represents the difference between the expected pressure drop for the preset condition and the actual pressure drop in the reductant delivery system,
Kp represents a proportional gain scalar factor, and
Ki represents an integral gain scalar factor.

The magnitudes of the proportional gain scalar factor Kp and the integral gain scalar factor Ki are selected to achieve a desired operating characteristic. This may include operating to achieve an underdamped operation, an overdamped operation, or a critically-damped operation. The operation of dynamically determining the adjustment factor 235 based upon a difference between the expected pressure drop for the preset condition and the actual pressure drop in the reductant delivery system 10 provides a closed-loop feedback control operation that adjusts a control command to the reductant injector 30 in order to achieve the desired pressure drop.

In one embodiment, the control operation that adjusts the control command to the reductant injector 30 in order to achieve the desired pressure drop may include determining an initial injector pulsewidth command based upon operating conditions, and adjusting the initial injector pulsewidth command based upon the difference between the expected pressure drop and the actual pressure drop. This may include decreasing the injector pulsewidth command when the difference between the expected pressure drop and the actual pressure drop is less than an expected pressure drop deviation, and increasing the injector pulsewidth command when the difference between the expected pressure drop and the actual pressure drop is greater than an expected pressure drop deviation.

In one embodiment, the control operation that adjusts the control command to the reductant injector 30 in order to achieve the desired pressure drop may include adjusting the initial injection frequency command based upon the difference between the expected pressure drop and the actual pressure drop. This may include decreasing the initial injection frequency command when the difference between the expected pressure drop and the actual pressure drop is less than an expected pressure drop deviation, and increasing the initial injection frequency command when the difference between the expected pressure drop and the actual pressure drop is greater than an expected pressure drop deviation.

Figure 3:
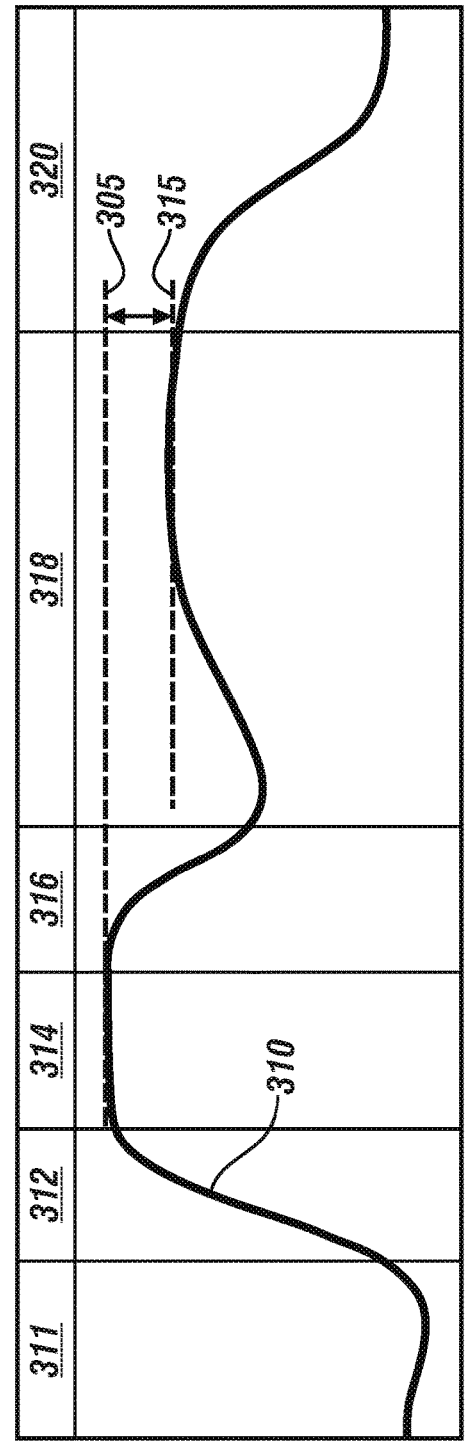
FIG. 3 graphically shows results in the form of fluidic pressure that is related to execution of an embodiment of the reductant injection control routine to control operation of an embodiment of the reductant delivery system in accordance with the disclosure.

FIG. 3 graphically shows results in the form of fluidic pressure that is related to execution of an embodiment of the reductant injection control routine 200 described with reference to FIG. 2 to control operation of an embodiment of the reductant delivery system 10 that is described with reference to FIG. 1. The results include fluidic pressure 310 in relation to time as may be measured by the pressure sensor 26 during operation of the reductant delivery system 10 under several operating conditions, as described. Pressure is indicated on the vertical axis 302 and time is indicated on the horizontal axis 304. After an initial period 311, the fluidic pump 20 is activated during period 312 to have a constant fluidic flowrate with the reductant injector 30 is not operating, i.e., under a state when there is no reductant dosing being commanded. As indicated, there is a period of pressure increase. During period 314, a zero-injector-flow pressure state is measured in the reductant delivery system 10 via the pressure sensor 26, as is indicated by line 305. During period 316, a dosing operation of the reductant delivery system 10 is commanded and initiated, with an associated drop in the fluidic pressure 310. During period 318, the closed-loop portion of the reductant injection control routine 200 operates, i.e., step 230 of the reductant injection control routine 200 is operating in conjunction with steps 210 and 240 to determine the final injector command 250, with an expected pressure drop (delta Pe) being indicated by line 315. The reductant injection control routine 200 executes to control the reductant injector 30 based upon the final injector command 250. During period 320, the dosing operation of the reductant delivery system 10 is discontinued, and control operations end.

Figure 4:
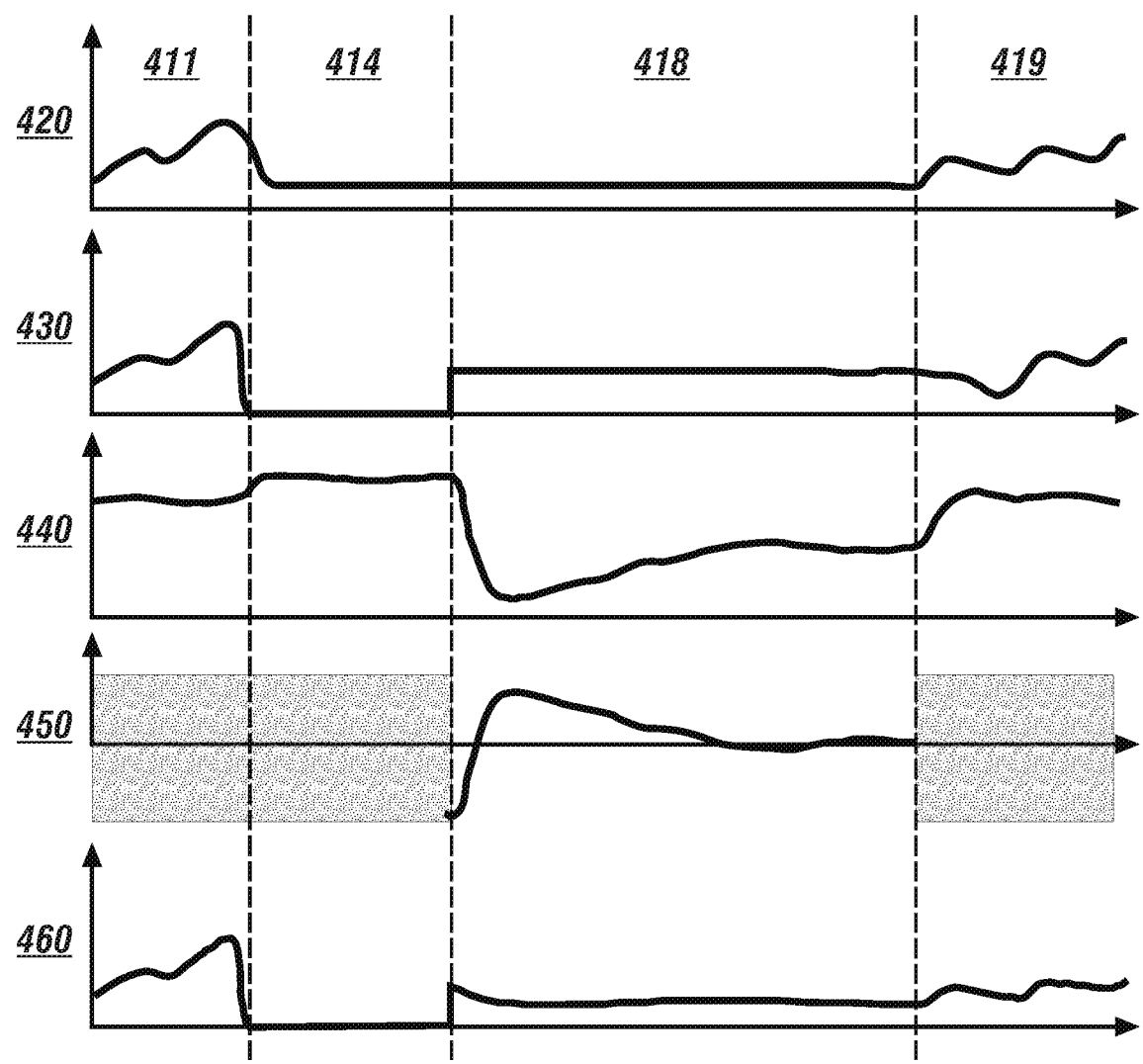
FIG. 4 graphically shows parameters related to execution of an embodiment of the reductant injection control routine to control operation of an embodiment of the reductant delivery system, wherein the parameters include pump flow delivery, reductant injection flow demand, line pressure in the reductant delivery system, a pressure drop error, and a reductant injector command, in accordance with the disclosure.

FIG. 4 graphically shows another set of results related to execution of an embodiment of the reductant injection control routine 200 described with reference to FIG. 2 to control operation of an embodiment of the reductant delivery system 10 that is described with reference to FIG. 1. Monitored parameters include pump flow delivery 420 (1/s); injection flow demand 430 (1/s); line pressure 440 (kPa), as measured by the pressure sensor 26; a pressure drop error 450 (kPa), i.e., the difference between the expected pressure drop for the preset condition and the actual pressure drop in the reductant delivery system; and injector command 460 (pw), i.e., the final injector command 250. The results are plotted for an initial uncontrolled period 411, a no-dosing period 414 wherein there is measured a zero-injector-flow pressure state in the reductant delivery system 10 that is captured via the pressure sensor 26, a dosing period 418, i.e., when the closed-loop portion of the reductant injection control routine 200 operates with the closed-loop portion, i.e., step 230 operating in conjunction with steps 210 and 240 to determine the final injector command 250, followed by an uncontrolled period 420.

During the no-dosing period 414, the injection flow demand 430 and the final injector command 250 are at zero, and the pump flow delivery 420 is commanded as described herein. Line pressure 440 as measured by the pressure sensor 26 is monitored to determine a steady-state value. The pressure drop error 450 is indeterminable.

When the dosing period 418 is subsequently commanded, the pump flow delivery 420 remains unchanged, and the injection flow demand 430 is commanded to a preset constant value based upon system demands. The line pressure 440 immediately decreases, and the pressure drop error 450 exhibiting a damping function until the adjustment factor 235 causes change to the final injector command 250 such that the pressure drop error 450 reaches zero, as indicated by the changes in the injector command 460 (pw).

Such a system provides a rapid compensation for drift in reductant flow rate to improve emissions control via the catalytic device 62 by minimizing system latencies such as reductant transport lag and reactions through the emissions systems.

The closed-loop reductant injection control routine 200 described with reference to FIG. 2 can be advantageously employed to reduce NOx reduction variation while minimizing NH3 consumption and breakthrough in an embodiment of the aftertreatment system 50 described with reference to FIG. 1 employing such correlation.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including an instruction set that can implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a reductant delivery system arranged to inject a reductant into an exhaust gas feedstream of an internal combustion engine, wherein the reductant delivery system includes a fluidic pump fluidly connected to a reductant injector that is disposed in an exhaust aftertreatment system upstream relative to a catalytic device, the method comprising:
    determining a desired reductant dosing rate;
    determining an initial injector command for controlling the reductant injector based upon the desired reductant dosing rate;
    dynamically determining an adjustment factor based upon a difference between an expected pressure drop and an actual pressure drop in the reductant delivery system under similar operating conditions; and
    controlling the reductant injector based upon the adjustment factor and the initial injector command to achieve the expected pressure drop in the reductant delivery system.

2. The method of claim 1, wherein dynamically determining the adjustment factor based upon the difference between the expected pressure drop and the actual pressure drop in the reductant delivery system under similar operating conditions includes:
    initially operating the fluidic pump at a preset state, operating the injector at a zero-flow state, and monitoring, via a pressure sensor, pressure upstream of the injector to determine a zero-flow pressure;
    activating the injector under a preset condition and monitoring the actual pressure drop upstream of the injector; and
    determining the adjustment factor based upon a difference between an expected pressure drop for the preset condition and the actual pressure drop in the reductant delivery system for the preset condition.

3. The method of claim 2, wherein determining the adjustment factor based upon the difference between the expected pressure drop for the preset condition and the actual pressure drop in the reductant delivery system for the preset condition comprises executing the following relationship:

$$ADJ=1+Kp*e(t)+Ki*\int e(t)$$

wherein:
    ADJ represents the adjustment factor,
    e(t) represents the difference between the expected pressure drop for the preset condition and the actual pressure drop for the preset condition,
    Kp represents a proportional gain scalar factor, and
    Ki represents an integral gain scalar factor.

4. The method of claim 3, wherein the proportional gain scalar factor Kp and the integral gain scalar factor Ki are selected to achieve a desired operating characteristic.

5. The method of claim 4, wherein the desired operating characteristic comprises one of an underdamped operation, an overdamped operation, or a critically-damped operation.

6. The method of claim 1, wherein controlling the reductant injector based upon the adjustment factor and the initial injector command to achieve the expected pressure drop in the reductant delivery system comprises:
    determining an initial injector pulsewidth command based upon operating conditions; and
    adjusting the initial injector pulsewidth command based upon the difference between the expected pressure drop and the actual pressure drop to achieve the expected pressure drop in the reductant delivery system.

7. The method of claim 6, wherein adjusting the initial injector pulsewidth command based upon the difference between the expected pressure drop and the actual pressure drop comprises decreasing the initial injector pulsewidth command when the difference between the expected pressure drop and the actual pressure drop is less than an expected pressure drop deviation.

8. The method of claim 6, wherein adjusting the initial injector pulsewidth command based upon the difference between the expected pressure drop and the actual pressure drop comprises increasing the initial injector pulsewidth command when the difference between the expected pressure drop and the actual pressure drop is greater than an expected pressure drop deviation.

9. The method of claim 1, wherein controlling the reductant injector based upon the adjustment factor and the initial injector command comprises:
    determining an initial injection frequency command based upon operating conditions; and
    dynamically adjusting the initial injection frequency command based upon the difference between the expected pressure drop and the actual pressure drop to achieve the expected pressure drop in the reductant delivery system.

10. The method of claim 9, wherein dynamically adjusting the initial injection frequency command based upon the difference between the expected pressure drop and the actual pressure drop comprises decreasing the initial injection frequency command when the difference between the expected pressure drop and the actual pressure drop is less than an expected pressure drop deviation.

11. The method of claim 9, wherein dynamically adjusting the initial injection frequency command based upon the difference between the expected pressure drop and the actual pressure drop comprises increasing the initial injection frequency command when the difference between the expected pressure drop and the actual pressure drop is greater than an expected pressure drop deviation.

12. A method for controlling a reductant delivery system arranged to inject a reductant into an exhaust aftertreatment system for an internal combustion engine, wherein the reductant delivery system includes a fluidic pump fluidly connected to an injector that is disposed in the exhaust aftertreatment system upstream relative to a catalytic device, the method comprising:

operating the fluidic pump at a preset state, operating the injector at a zero-flow state, and monitoring, via a pressure sensor, pressure upstream of the injector to determine a zero-flow pressure;

activating the injector under a preset condition and monitoring an actual pressure drop upstream of the injector;

determining a pressure drop deviation based upon the actual pressure drop upstream of the injector and an expected pressure drop upstream of the injector under similar operating conditions;

dynamically determining an adjustment to the activation of the injector based upon the pressure drop deviation; and controlling the injector based upon the adjustment to achieve the expected pressure drop in the reductant delivery system.

13. An exhaust aftertreatment system arranged to inject a reductant into an exhaust gas feedstream of an internal combustion engine, comprising:

a reductant delivery system including a fluidic pump fluidly connected to a reductant injector including a nozzle that is disposed in an exhaust aftertreatment system upstream relative to a catalytic device;

a pressure sensor disposed to monitor fluidic pressure in the reductant delivery system;

a controller, operatively connected to the reductant delivery system and in communication with the pressure sensor, the controller including an instruction set, the instruction set executable to:

determine a desired reductant dosing rate;

determine an initial injector command for controlling the reductant injector based upon the desired reductant dosing rate;

dynamically determine an adjustment factor based upon a difference between an expected pressure drop and an actual pressure drop in the reductant delivery system under similar operating conditions; and control the reductant injector based upon the adjustment factor and the initial injector command to achieve the expected pressure drop in the reductant delivery system.

14. The exhaust aftertreatment system of claim 13, wherein the instruction set executable to dynamically determine the adjustment factor based upon the difference between the expected pressure drop and the actual pressure drop in the reductant delivery system includes the instruction set executable to:

operate the fluidic pump at a preset state, operate the reductant injector at a zero-flow state, and monitor, via the pressure sensor, pressure upstream of the reductant injector to determine a zero-flow pressure;

activate the reductant injector under a preset condition and monitor the actual pressure drop upstream of the injector; and determine the adjustment factor based upon a difference between an expected pressure drop for the preset condition and the actual pressure drop in the reductant delivery system.

15. The exhaust aftertreatment system of claim 13, wherein the catalytic device comprises a selective catalytic reduction device.

16. The exhaust aftertreatment system of claim 13, wherein the catalyst comprises a selective catalytic reduction device and particulate filter.

17. The exhaust aftertreatment system of claim 13, wherein the instruction set executable to control the reductant injector based upon the adjustment factor and the initial injector command comprises the instruction set executable to:

determine an initial injector pulsewidth command based upon operating conditions; and adjust the initial injector pulsewidth command based upon the difference between the expected pressure drop and the actual pressure drop to achieve the expected pressure drop in the reductant delivery system.

18. The exhaust aftertreatment system of claim 17, wherein the instruction set executable to adjust the initial injector pulsewidth command based upon the difference between the expected pressure drop and the actual pressure drop comprises the instruction set executable to decrease the initial injector pulsewidth command when the difference between the expected pressure drop and the actual pressure drop is less than an expected pressure drop deviation, and increase the initial injector pulsewidth command when the difference between the expected pressure drop and the actual pressure drop is greater than the expected pressure drop deviation.

19. The exhaust aftertreatment system of claim 17, wherein the instruction set executable to control the reductant injector based upon the adjustment factor and the initial injector command comprises the instruction set executable to:

determine an initial injection frequency command based upon operating conditions; and adjust the initial injection frequency command based upon the difference between the expected pressure drop and the actual pressure drop.

20. The exhaust aftertreatment system of claim 19, wherein the instruction set executable to adjust the initial injection frequency command based upon the difference between the expected pressure drop and the actual pressure drop under similar operating conditions comprises:

the instruction set executable to decrease the initial injection frequency command when the difference between the expected pressure drop and the actual pressure drop is less than an expected pressure drop deviation; and the instruction set executable to increase the initial injection frequency command when the difference between the expected pressure drop and the actual pressure drop is greater than the expected pressure drop deviation.

* * * * *